United States Patent
Bober

(10) Patent No.: US 7,430,338 B2
(45) Date of Patent: Sep. 30, 2008

(54) METHOD AND DEVICE FOR PROCESSING AND FOR SEARCHING FOR AN OBJECT BY SIGNALS CORRESPONDING TO IMAGES

(75) Inventor: Miroslaw Z. Bober, Surrey (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/822,833

(22) Filed: Jul. 10, 2007

(65) Prior Publication Data

US 2007/0258659 A1    Nov. 8, 2007

Related U.S. Application Data

(62) Division of application No. 11/156,715, filed on Jun. 21, 2005, now Pat. No. 7,257,277, which is a division of application No. 09/786,161, filed as application No. PCT/JP00/04401 on Jul. 3, 2000, now Pat. No. 6,931,154.

(30) Foreign Application Priority Data

Jul. 5, 1999  (GB) ................................. 9915699.4

(51) Int. Cl.
*G06K 9/36* (2006.01)
(52) U.S. Cl. .................. 382/276; 382/199; 382/305
(58) Field of Classification Search ............ 382/103, 382/181, 190, 199, 201, 203, 305, 276; 358/403; 707/1–10
See application file for complete search history.

(56) References Cited

U.S. PATENT DOCUMENTS

| 4,989,257 A | 1/1991 | Horowitz |
| 5,081,689 A | 1/1992 | Meyer et al. |
| 5,119,439 A | 6/1992 | Osawa et al. |
| 5,487,116 A | 1/1996 | Nakano et al. |
| 6,014,461 A | 1/2000 | Hennessey et al. |
| 6,182,069 B1 | 1/2001 | Niblack et al. |
| 6,459,824 B1 | 10/2002 | Lee et al. |
| 6,882,756 B1 | 4/2005 | Bober |

FOREIGN PATENT DOCUMENTS

| EP | 0281725 A | 9/1988 |
| GB | 2203877 A | 10/1988 |
| JP | 6-309465 A | 11/1994 |
| JP | 10-55447 A | 2/1998 |

(Continued)

OTHER PUBLICATIONS

Mokhtarian et al., Robust and Efficient Shape Indexing Through Curvature Scale Space, Proc. British Machine Vision Conference, pp. 53-62, Edinburgh, UK, 1996.

(Continued)

*Primary Examiner*—Daniel G Mariam
(74) *Attorney, Agent, or Firm*—Birch, Stewart, Kolasch & Birch, LLP

(57) ABSTRACT

A method of representing an object appearing in a still or video image, by processing signals corresponding to the image, comprises deriving the peak values in CSS space for the object outline and applying a non-linear transformation to said peak values to arrive at a representation of the outline.

8 Claims, 6 Drawing Sheets

FOREIGN PATENT DOCUMENTS

WO        WO-88-02158 A      3/1988

OTHER PUBLICATIONS

Mokhtarian et al., Indexing An Image Database by Shape Content Using Curvature Scale Space, Proc. IEE Colloqium on Intelligent Databases, London, 1995, pp. 4/1-4/5.

D.T. Nguyen et al., 8049E I.E.E. Proceedings-E/Computers and Digital Techniques, vol. 135, No. 6, Part E., pp. 301-311, "Scale Based Algorithm for Recognition of Blurred Planar Objects," Nov. 1, 1988.

F. Mokhtarian et al., Machine Intelligence, vol. 14, No. 8, pp. 789-805, "A Theory of Multiscale, Curvature-Based Shape Representation for Planar Curves", Aug. 1, 1992.

S. Abbasi et al., Lecture Notes in Computer Science, vol. 1252, pp. 284-295, "Reliable Classification of Chrysantehmum Leaves Through Curvature Scale Space", 1997.

B. Guensel et al., Pattern Recognition, vol. 31, No. 7 pp. 931-944, "Shape Similarity Matching for Query-by-Example", Jul. 1, 1998.

F. Mokhtarian et al.. Lecture Notes in Computer Science. vol. 1311. p. 140-147. "A New Approach to Computation of Curvature Scale Space Image for Shape Similarity Retrieval", 1997.

N. Katzier et al., Proceedings of the International Conference on Pattern Recognition, vol. Conf., No. 10, pp. 842-846, "Planar Curve Segmentation for Recognition of Partially Occluded Shapes", 1990.

Farzin Mohktarian "Silhouette-Based isolated Object Recognition through Curvature-Scale Space", IEEE Transactions on Pattern, Analysis and Machine Intelligence, vol. 17, No. 5, May 1995, pp. 539-544.

METHOD AND DEVICE FOR PROCESSING AND FOR SEARCHING FOR AN OBJECT BY SIGNALS CORRESPONDING TO IMAGES

RELATED APPLICATION INFORMATION

This application is a Divisional of U.S. application Ser. No. 11/156,715 filed on Jun. 21, 2005, now U.S. Pat. No. 7,257,277 which is a Divisional of U.S. patent Ser. No. 09/786,161 filed Mar. 2, 2001 now U.S. Pat. No. 6,931,154, issued on Aug. 16, 2005; which claims priority to Japan Application PCT/JP00/04401 filed on Jul. 3, 2000 under 35 U.S.C. § 120; based on UK 9915699.4 filed Jul. 5, 1999 under 35 U.S.C. § 119; the entire content of which are hereby incorporated by reference.

BACKGROUND OF THE INVENTION

1. Technical Field

The present invention relates to the representation of an object appearing in a still or video image, such as an image stored in a multimedia database, especially for searching purposes, and to a method and apparatus for searching for an object using such a representation.

2. Description of Related Art

In applications such as image or video libraries, it is desirable to have an efficient representation and storage of the outline or shape of objects or parts of objects appearing in still or video images. A known technique for shape-based indexing and retrieval uses Curvature Scale Space (CSS) representation. Details of the CSS representation can be found in the papers "Robust and Efficient Shape Indexing through Curvature Scale Space" Proc. British Machine Vision conference, pp 53-62, Edinburgh, UK, 1996 and "Indexing an Image Database by Shape Content using Curvature Scale Space" Proc. IEE Colloquium on Intelligent Databases, London 1996, both by F. Mokhtarian, S. Abbasi and J. Kittler, the contents of which are incorporated herein by reference.

The CSS representation uses a curvature function for the outline of the object, starting from an arbitrary point on the outline. The curvature function is studied as the outline shape is evolved by a series of deformations which smooth the shape. More specifically, the zero crossings of the derivative of the curvature function convolved with a family of Gaussian filters are computed. The zero crossings are plotted on a graph, known as the Curvature Scale Space, where the x-axis is the normalised arc-length of the curve and the y-axis is the evolution parameter, or in other words the parameter of the filter applied. The plots on the graph form loops characteristic of the outline. Each convex or concave part of the object outline corresponds to a loop in the CSS image. The co-ordinates of the peaks of the most prominent loops in the CSS image are used as a representation of the outline.

To search for objects in images stored in a database matching the shape of an input object, the CSS representation of an input shape is calculated. The similarity between an input shape and stored shapes is determined by comparing the position and height of the peaks in the respective CSS images using a matching algorithm.

It is desirable to find a representation of an object outline that is invariant under changes of imaging conditions, such as changes in scale, rotations, some deformations of the outline and projective transformation. It is also desirable to represent a shape in a manner that is insensitive to shape variability within a broader class. For example, a representation of the object 'car' should be invariant to the model and make of the car so that all car-like shapes can be easily retrieved using the extracted feature representation.

BRIEF SUMMARY OF THE INVENTION

Accordingly the present invention provides a method of representing an object appearing in a still or video image, by processing signals corresponding to the image, the method comprising deriving a plurality of numerical values representing features appearing on the outline of an object and applying a scalar or non-linear transformation to said values to arrive at a representation of the outline. Preferably, the transformation is a non-linear transformation. Preferably, a CSS representation is used, and preferably the peak height values corresponding to the evolution parameter are transformed.

It has been found that by applying a transformation, especially to CSS values, as in the invention, object retrieval performance is improved.

BRIEF DESCRIPTION OF THE DRAWINGS

Embodiments of the present invention will be described with reference to the accompanying drawings of which.

DETAILED DESCRIPTION OF THE INVENTION

Figure 1:
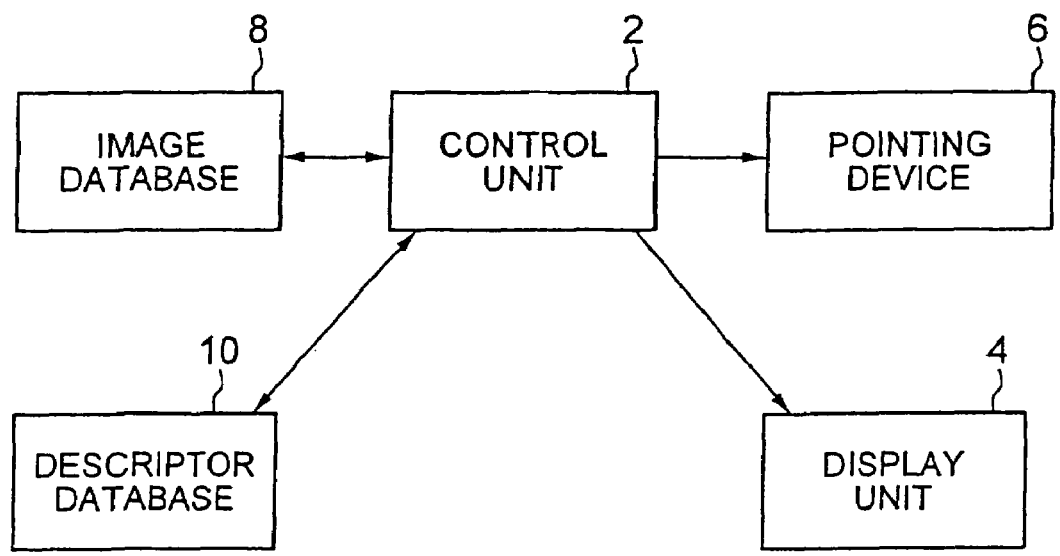
FIG. 1 is a block diagram of a video database system.

FIG. 1 shows a computerised video database system according to an embodiment of the invention. The system includes a control unit 2 in the form of a computer, a display unit 4 in the form of a monitor, a pointing device 6 in the form of a mouse, an image database 8 including stored still and video images and a descriptor database 10 storing descriptors of objects or parts of objects appearing in images stored in the image database 8.

A descriptor for the shape of each object of interest appearing in an image in the image database is derived by the control unit 2 and stored in the descriptor database 10. The control unit 2 derives the descriptors operating under the control of a suitable program implementing a method as described below.

Firstly, for a given object outline, a CSS representation of the outline is derived. This is done using the known method as described in one of the papers mentioned above.

More specifically, the outline is expressed by a representation $\Psi=\{(x(u), y(u), u \in [0, 1]\}$ where u is a normalised arc length parameter.

The outline is smoothed by convolving $\Psi$ with an 1D Gaussian kernel $g(u, \sigma)$, and the curvature zero crossings of the evolving curve are examined at $\sigma$ charges. The zero crossing are identified using the following expression for the curvature:

$$k(u, \sigma) = \frac{X_u(u, \sigma)Y_{uu}(u, \sigma) - X_{uu}(u, \sigma)Y_u(u, \sigma)}{(X_u(u, \sigma)^2 + Y_u(u, \sigma)^2)^{3/2}}$$

where $X(u,\sigma)=x(u)*g(u,\sigma)$ $Y(u,\sigma)=y(u)*g(u,\sigma)$ and $X_u(u,\sigma)=x(u)*g_u(u,\sigma)$ $X_{uu}(u,\sigma)=x(u)*g_{uu}(u,\sigma)$ Here * represents a convolution and the subscripts represent derivatives.

The number of curvature zero crossings changes as σ changes, and when σ is sufficiently high Ψ is a convex curve with no zero crossings.

The zero crossing points are plotted on a graph, known as the CSS image space. This results in a plurality of characteristic curves. The peaks of the characteristic curves are identified and the corresponding co-ordinates are extracted and stored. In general terms, this gives a set of n co-ordinate pairs [(x1,y1), (x2,y2), ... (xn,yn)], where n is the number of peaks, and xi is the arc-length position of the ith peak and yi is the peak height.

In this embodiment, a binomial filter with coefficients (1/4, 1/2, 1/4) is used as an approximation of a Gaussian filter with some reduction of computational complexity. The reduction in computational complexity results from convenient filter coefficients which can be efficiently implemented on a DSP or a general-purpose processor.

The peak values, or in other words, the y-component values for the peaks, are then processed further. More specifically, the y values are transformed using the transformation:

$$y' = a\, \text{pow}(y,b) + c \quad (1)$$

where pow(y,b) denotes y to the power b.

This results in a new set of peak values [(x1, y'1), (x2, y'2) ... (xn, y'n)], which values are stored in the descriptor database as a descriptor of the outline.

Figure 2:
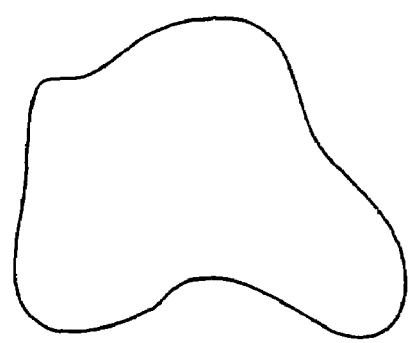
FIG. 2 is a drawing of an outline of an object.
Figure 3:
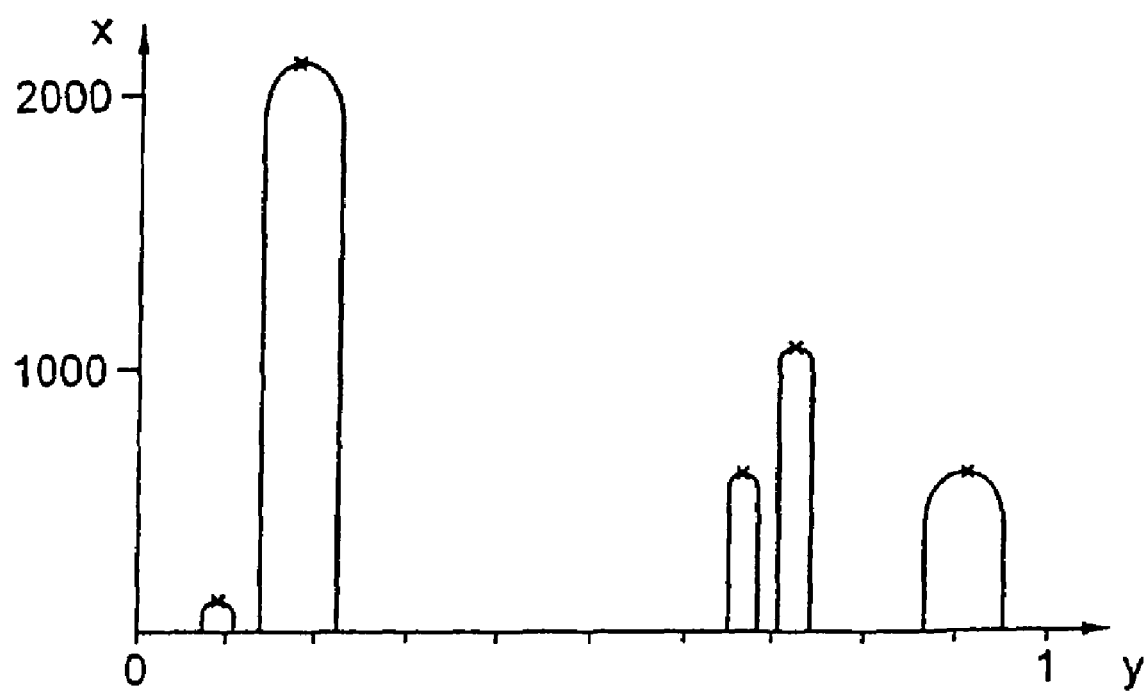
FIG. 3 is a CSS representation of the outline of FIG. 2.

As a specific example, the outline shown in FIG. 2 results in a CSS image as shown in FIG. 3. Details of the co-ordinates of the peaks of the curves in the CSS image are given in Table 1 below.

TABLE 1

| Peak Index | X | Y |
|---|---|---|
| 1 | 0.124 | 123 |
| 2 | 0.68 | 548 |
| 3 | 0.22 | 2120 |
| 4 | 0.773 | 1001 |
| 5 | 0.901 | 678 |

The transformation given above is then applied, with a=6, b=0.5 and c=0. In other words, the square root of the original y value is taken and multiplied by a constant. This results in the following values:

TABLE 2

| Peak Index | X | Y |
|---|---|---|
| 1 | 0.124 | 67 |
| 2 | 0.68 | 140 |
| 3 | 0.22 | 276 |
| 4 | 0.773 | 190 |
| 5 | 0.901 | 156 |

Here, the values are rounded to the nearest integer, but other roundings can be used.

Figure 4:
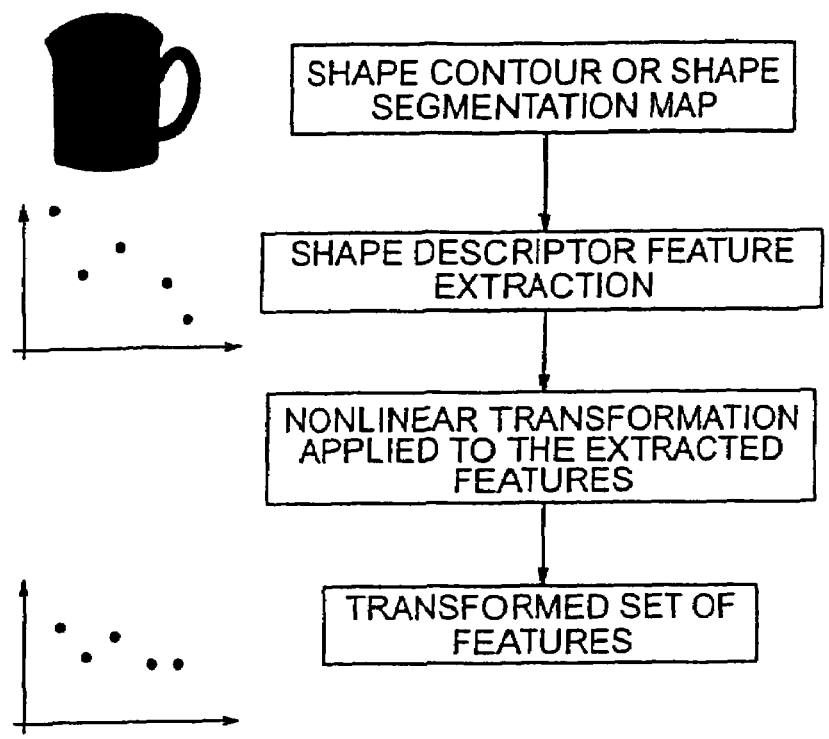
FIG. 4 is a diagram illustrating the representation of a shape.

Another example is shown in FIG. 4.

Figure 5:
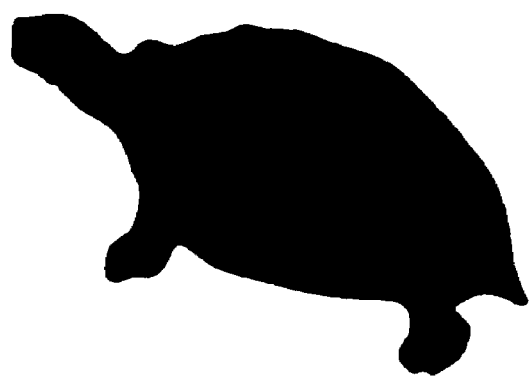
FIG. 5 is a drawing of the shape of an object.
Figure 6:
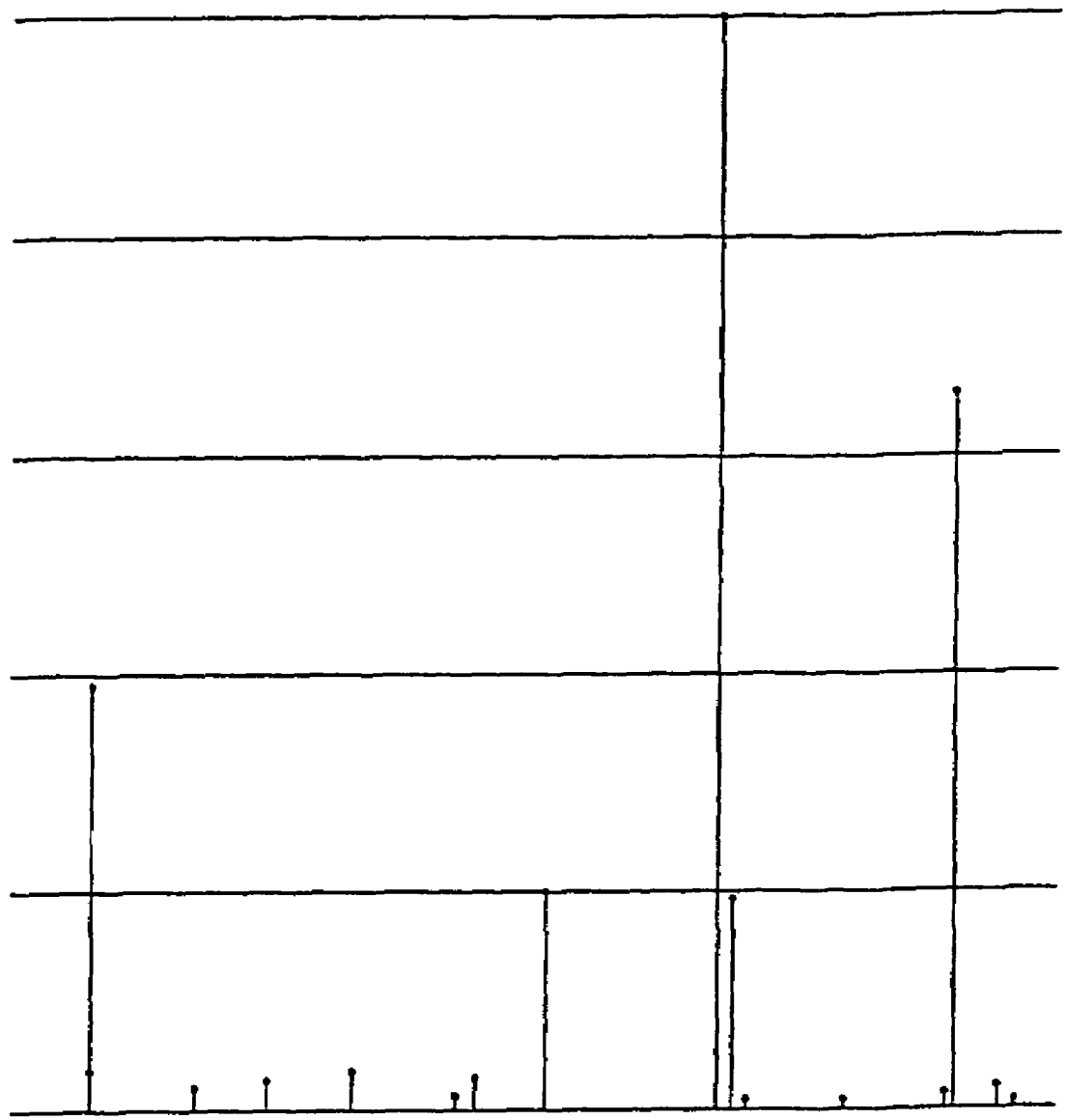
FIG. 6 is a CSS representation of the shape of FIG. 5.
Figure 7:
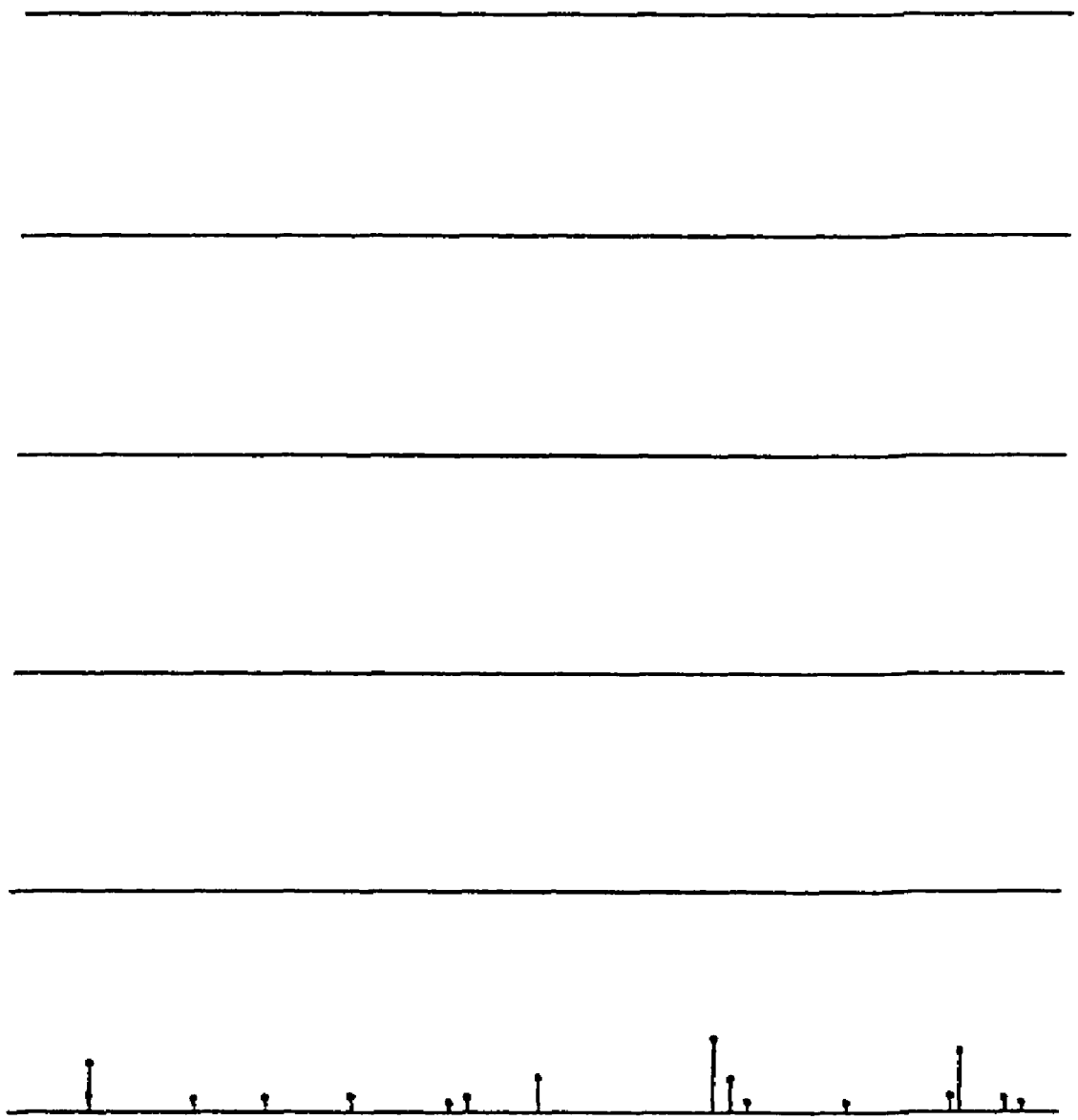
FIG. 7 is a transformed representation of the shape of FIG. 5.
Figure 8:
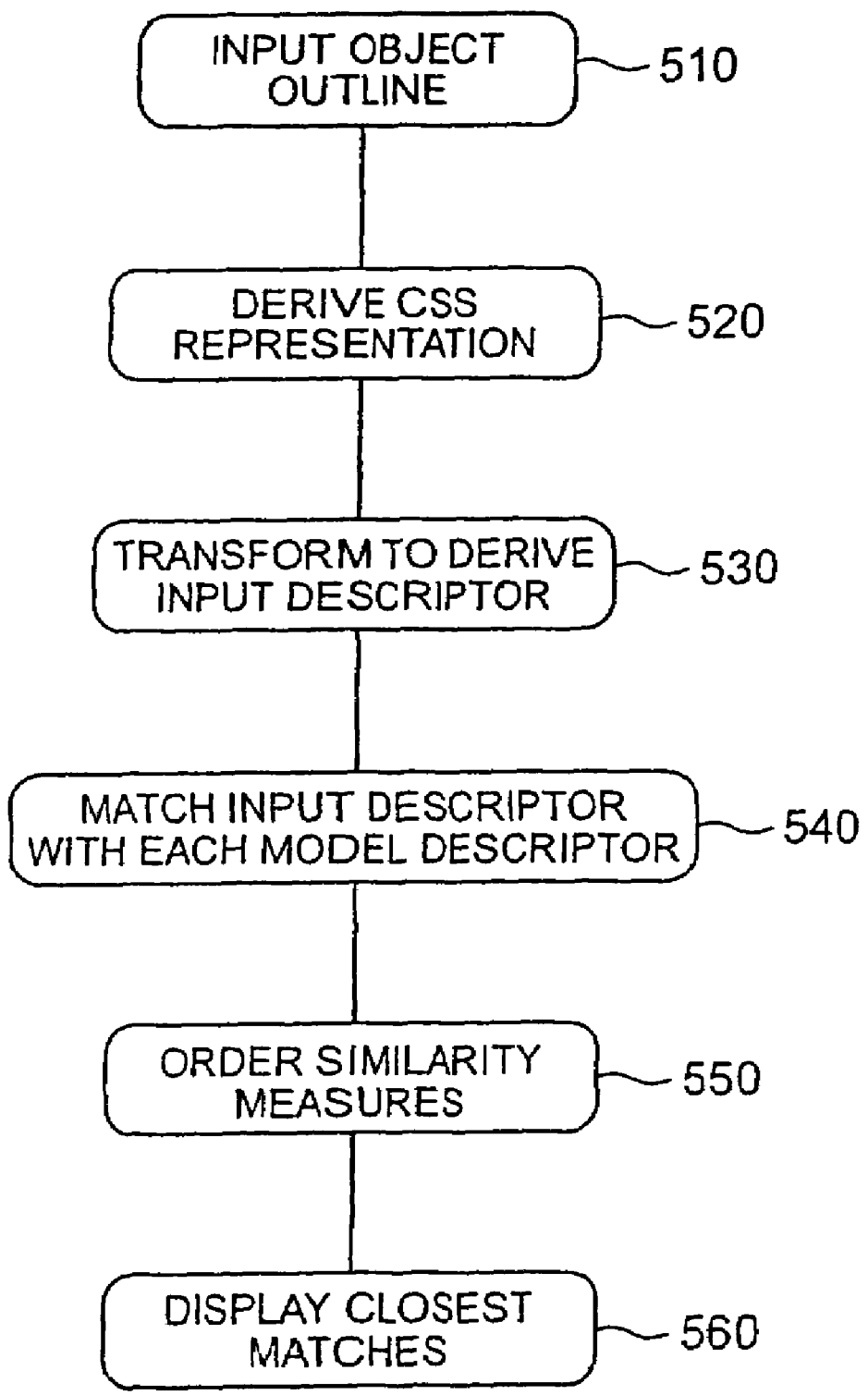
FIG. 8 is a block diagram illustrating a searching method.

FIG. 5 shows another example of an object shape, in this case a turtle. FIG. 6 shows the CSS peaks for the shape of FIG. 5. FIG. 7 shows the transformed peaks of FIG. 6, using the transformation given in equation (1) above, with a=6.5, b=0.5 and c=0.

The stored descriptors are used for searching purposes. The user initiates a search by drawing an object outline on the display using the pointing device (step 510). The control unit 2 then derives a CSS representation of the input outline (step 520) and then applies the transformation to the y values as described above (step 530). The resulting descriptor of the input outline is then compared with each stored descriptor in the descriptor database, known in the following as the model descriptors, using a known matching procedure (step 540).

The matching comparison is carried out using a suitable algorithm resulting in a similarity measure for each descriptor in the database. A known matching algorithm such as described in the above-mentioned papers can be used. That matching procedure is briefly described below.

Given two closed contour shapes, the image curve Ti and the model curve Tin and their respective sets of peaks {(xi1, yi1),(xi2,yi2), . . . ,(xin,yin)} and {(xm1,ym1), (xm2,ym2), . . . ,(xmn,ymn)} the similarity measure is calculated. The similarity measure is defined as a total cost of matching of peaks in the model into peaks in the image. The matching which minimises the total cost is determined using a dynamic programming. The algorithm recursively matches the peaks from the model to the peaks from the image and calculates the cost of each such match. Each model peak can be matched with only one image peak and each image peak can be matched with only one model peak. Some of the model and or image peak may remain unmatched, and there is an additional penalty cost for each unmatched peak. Two peaks can be matched if their horizontal distance is less then 0.2. The cost of a match is the length of the straight line between the two matched peaks. The cost of an unmatched peak is its height.

In more detail the algorithm works by creating and expanding a tree-like structure, where nodes correspond to matched peaks:

1. Create starting node consisting of the largest maximum of the image (xik, yik) and the largest maximum of the model (xir,yir).

2. For each remaining model peak which is within 80 percent of the largest maximum of the image peaks create an additional starting node.

3. Initialise the cost of each starting node created in 1 and 2 to the absolute difference of the y-coordinate of the image and model peaks linked by this node.

4. For each starting node in 3, compute the CSS shift parameter alpha, defined as the difference in the x (horizontal) coordinates of the model and image peaks matched in this starting node. The shift parameter will be different for each node.

5. For each starting node, create a list of model peaks and a list of image peaks. The list hold information which peaks are yet to be matched. For each starting node mark peaks matched in this node as "matched", and all other peaks as "unmatched".

6. Recursively expand a lowest cost node (starting from each node created in steps 1-6 and following with its children nodes) until the condition in point 8 is fulfilled. To expand a node use the following procedure:

7. Expanding a node:

If there is at least one image and one model peak left unmatched:

select the largest scale image curve CSS maximum which is not matched (xip,yip). Apply the starting node shift parameter (computed in step 4) to map the selected maximum to the model CSS image—now the selected peak has coordinates (xip-alpha, yip). Locate the nearest model curve peak which is unmatched (xms,yms). If the horizontal distance between the two peaks is less then 0.2 (i.e: |xip-alpha-xms|<0.2), match the two peaks and define the cost of the match as the length of the straight line between the two peaks. Add the cost of the match to the total cost of that node. Remove the matched peaks from the respective lists by marking them as "matched". If the horizontal distance between the two peaks is greater than 0.2, the image peak (xip,yip) cannot be matched. In that case add its height yip to the total cost and remove only the peak (xip,yip) from the image peak list by marking it as "matched".

Otherwise (There are only image peaks or there are only model peaks left unmatched):

Define the cost of the match as the height of the highest unmatched image or model peak and remove that peak from the list.

8. If after expanding a node in 7 there are no unmatched peaks in both the image and model lists, the matching procedure is terminated. The cost of this node is the similarity measure between the image and model curve. Otherwise, go to point 7 and expand the lowest cost node.

The above procedure is repeated with the image curve peaks and the model curve peaks swapped. The final matching value is the lower of the two.

As another example, for each position in the ordering, the distance between the input x value and the corresponding model x value and the distance between the input y value and the corresponding model y value are calculated. The total distance over all the positions is calculated and the smaller the total distance, the closer the match. If the number of peaks for the input and the model are different, the peak height for the leftovers is included in the total distance.

The above steps are repeated for each model in the database (step 480).

The similarity measures resulting from the matching comparisons are ordered (step 490) and the objects corresponding to the descriptors having similarity measures indicating the closest match (i.e. here the lowest similarity measures) are then displayed on the display unit 4 for the user (step 500). The number of objects to be displayed can be pre-set or selected by the user.

An alternative embodiment will now be described. This embodiment is the same as the previous embodiment, except that a different transformation is used. More specifically, the y values are transformed using the transformation:

$$y' = a_0 + a_1 y.$$

In other words, a linear, scaling, transformation is applied. Here, $a_0=41$, $a_1=0.19$.

In a variation, $a_0=0$ and $a_1=0.27$.

Different values of $a_0$ and $a_1$ can be used as appropriate.

The searching and matching procedure is essentially as described in the previous embodiment.

It has been found that applying a transformation, especially a linear transformation involving scaling or a non-linear transformation, as described above results in a descriptor which is less sensitive, eg to changes of shape outline within an object class, which consequently results in improved retrieval of objects.

In the embodiments described above, the transformation is applied to the CSS values before storing in the descriptor database 10. Alternatively, the CSS values can be stored in the database 10, and the transformation carried out as part of the searching process, before the matching procedure is performed.

In the described embodiments, the transformations are applied to the y-co-ordinate values. However, they may be applied to the x-co-ordinate values.

A system according to the invention may, for example, be provided in an image library. Alternatively, the databases may be sited remote from the control unit of the system, connected to the control unit by a temporary link such as a telephone line or by a network such as the internet. The image and descriptor databases may be provided, for example, in permanent storage or on portable data storage media such as CD-ROMs or DVDs.

Components of the system as described may be provided in software or hardware form. Although the invention has been described in the form of a computer system, it could be implemented in other forms, for example using a dedicated chip.

Specific examples have been given of methods of representing a 2D shape of an object, here, using CSS representation, and of methods for calculating values representing similarities between two shapes but any suitable such methods can be used.

The invention can also be used, for example, for matching images of objects for verification purposes, or for filtering.

The invention claimed is:

1. A method of representing an object appearing in an image or a sequence of images, by processing signals corresponding to the image, the method comprising deriving a plurality of pairs of co-ordinate values for peaks of the outline of the object in curvature scale space on the basis of the signals and applying a transformation to said co-ordinate values to arrive at a representation of the outline, wherein said transformation is in the form of y'=a pow (y,b)+c, where a, b and c are constants and pow (y,b) denotes y to the power b, where y represents one co-ordinate value of the pairs of co-ordinate values, and y' represents said one co-ordinate value of the pairs of co-ordinate values after said transformation is applied.

2. A method for searching for an object in an image or sequence of images by processing signals corresponding to images, the method comprising inputting a query in the form of a two-dimensional outline, deriving a descriptor of said outline using a method as claimed in any one of claim 1, obtaining a descriptor of objects in stored images derived using a method as claimed in any proceeding claim and comparing said query descriptor with each descriptor for a stored object, and selecting and displaying at least one result corresponding to an image containing an object for which the comparison indicates a degree of similarity between the query and said object.

3. An apparatus comprising:

An image database storing an image or a sequence of images;

a descriptor database storing descriptors of objects or parts of objects appearing in images or sequences of images stored in the image database; and a control unit configured to perform the method as claimed in claim 1 or claim 2.

4. A computer system comprising:

An image database storing an image or a sequence of images;

a descriptor database storing descriptors of objects or parts of objects appearing in images or sequences of images stored in the image database; and a control unit programmed to perform the method as claimed in claim 1 or claim 2.

5. A computer-readable storage medium storing computer-executable process steps for implementing a method as claimed in claim 1 or claim 2.

6. A method as claimed in claim 1 wherein said one co-ordinate value of the pairs of co-ordinate values corresponds to the height of said peaks.

7. A computer readable medium having stored thereon a computer executable program for generating an image or a sequence of images, the computer executable program when executed causes a computer system to implement:

a derivation of a plurality of pairs of co-ordinate values for peaks of the outline of the object in curvature scale space on the basis of the signals; and applying a transformation to said co-ordinate values to arrive at a representation of the outline, wherein said transformation is in the form of y'=a pow (y,b)+c, where a, b and c are constants and pow (y,b) denotes y to the power b, where y represents one co-ordinate value of the pairs of co-ordinate values, and y' represents said one co-ordinate value of the pairs of co-ordinate values after said transformation is applied.

8. A computer system programmed to generate an object appearing in an image or a sequence of images, by processing signals corresponding to the images the computer system including a computer readable medium having stored thereon a computer executable program comprising:

a derivation of a plurality of pairs of co-ordinate values for peaks of the outline of the object in curvature scale space on the basis of the signals; and applying a transformation to said co-ordinate values to arrive at a representation of the outline, wherein said transformation is in the form of y'=a pow (y,b)+c, where a, b and c are constants and pow (y,b) denotes y to the power b, where y represents one co-ordinate value of the pairs of co-ordinate values, and y' represents said one co-ordinate value of the pairs of co-ordinate values after said transformation is applied.

* * * * *